United States Patent
Loudon

(10) Patent No.: US 7,472,917 B2
(45) Date of Patent: Jan. 6, 2009

(54) WHEELBARROW TRAILER

(76) Inventor: Kevin D. Loudon, 1128 N. Kansas Ave., Hastings, NE (US) 68901

( * ) Notice: Subject to any disclaimer, the term of this patent is extended or adjusted under 35 U.S.C. 154(b) by 0 days.

(21) Appl. No.: 11/250,105

(22) Filed: Oct. 14, 2005

(65) Prior Publication Data

US 2007/0085284 A1    Apr. 19, 2007

(51) Int. Cl.
    B62K 27/00    (2006.01)
(52) U.S. Cl. .................. 280/47.34; 280/656; 280/47.31; 280/292
(58) Field of Classification Search .............. 280/43.14, 280/47.3, 47.17, 47.31, 47.32, 47.34, 288.4, 280/292, 511, 652, 653, 656, 659
    See application file for complete search history.

(56) References Cited

U.S. PATENT DOCUMENTS

| 2,370,988 | A | * | 3/1945 | Neal ........................... 280/496 |
| 3,563,397 | A | * | 2/1971 | Bause ......................... 414/349 |
| 3,734,536 | A | * | 5/1973 | Dever et al. .................. 280/204 |
| 3,784,230 | A | * | 1/1974 | Worrall, Jr. ............... 280/415.1 |
| 4,052,079 | A | * | 10/1977 | Lehman ...................... 280/47.2 |
| 4,155,678 | A | * | 5/1979 | Lehman et al. ............. 414/483 |
| 4,466,632 | A | * | 8/1984 | DeVorak ................... 280/479.3 |
| 4,740,008 | A | * | 4/1988 | Johnson ....................... 280/475 |
| 4,949,987 | A | * | 8/1990 | Gallatin ....................... 280/459 |
| 5,211,254 | A | * | 5/1993 | Harris, III et al. .......... 180/19.1 |
| 5,509,681 | A | * | 4/1996 | Keller ...................... 280/415.1 |
| 5,607,270 | A | * | 3/1997 | Zimmerman ................... 410/3 |
| 6,446,989 | B1 | * | 9/2002 | Intengan .................. 280/47.34 |
| 7,140,630 | B2 | * | 11/2006 | Abel ........................... 280/292 |
| 7,219,919 | B2 | * | 5/2007 | Tipton ........................ 280/651 |

* cited by examiner

*Primary Examiner*—Christopher Ellis
*Assistant Examiner*—Bridget Avery
(74) *Attorney, Agent, or Firm*—Michael I Kroll

(57) ABSTRACT

A wheel barrow consisting of left and right rear axles, left and right rear wheel assemblies and a hitch coupler for towing at high speeds on public roads having left and right structural rails. Both axles are assembled to the left and right structural rails supported at the front by a structural member bracket. Both structural rails serve as handles at the rear. Left and right coupler brackets are assembled to the structural rails to support a coupler which is mounted on both coupler brackets above the front axle, wheel assembly and structural members. Left and right front axle brackets are assembled to both structural rails to support the front axle and wheel assembly. A tub is assembled to both structural rails for loading and unloading. The wheel barrow couples to a vehicle hitch by raising the front off the ground and lowering on the vehicle ball and hitch.

4 Claims, 4 Drawing Sheets

WHEELBARROW TRAILER

CROSS-REFERENCE TO RELATED APPLICATIONS

Figure 1:
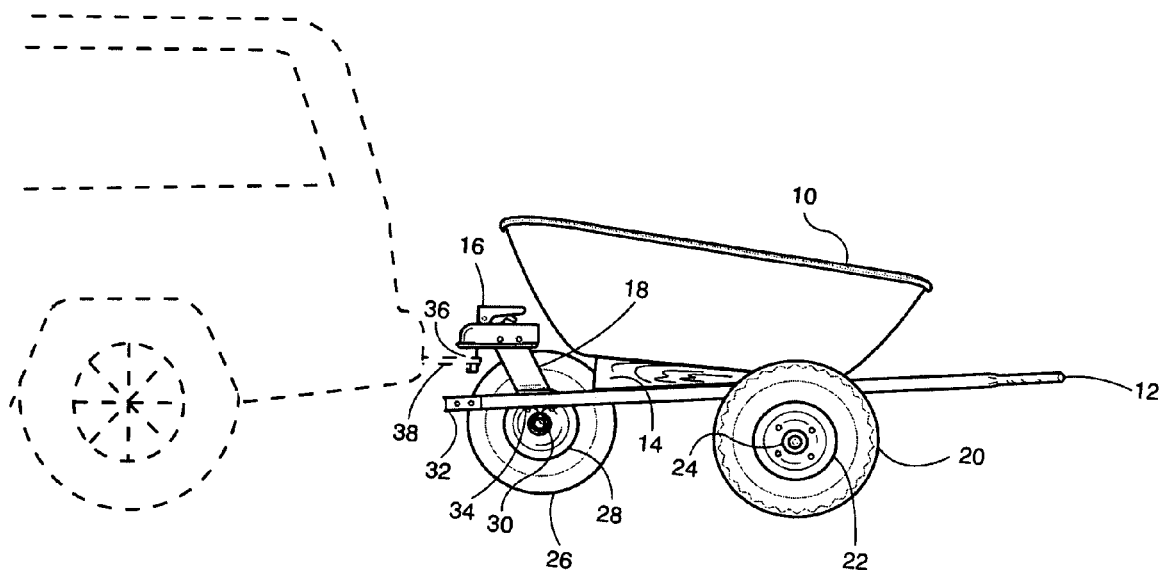

Not Applicable.

BACKGROUND

1. Field of Invention

An improved wheelbarrow that functions as a wheelbarrow trailer. The wheel barrow trailer can be coupled to class I-V or higher rated motor vehicle receiver hitch systems for transportation of items and materials on public highways, public roads, nonpublic roads and off-road surfaces from one geographical location to another geographical location. The present method of transporting material on public highways, public roads, nonpublic roads and off-road surfaces requires a larger, heavier and more expensive flatbed or open trailer. This method is laborious as material must be handled twice-once to load and a second time to unload. Such a trailer+s size prohibits it from being positioned close to the working area as it requires a motor vehicle to back up the trailer or tow in a forward position, which is prohibitive in confined areas. If backed up onto a lawn, a motor vehicle's weight can cause tire ruts in a yard. Furthermore a utility trailer is cumbersome to hitch and unhitch to a motor vehicle and requires larger storage space.

With the popularity of sport utility motor vehicles (SUVs) and pickup trucks, which most come provided with standard accessories such as tow hitches, there is an opportunity for consumers to conveniently haul and/or tow material and items from one geographical location to another geographical location using a wheelbarrow trailer.

With my wheelbarrow trailer, items and materials can be loaded at the most optimum location to reduce labor and time. Material then can be unloaded by manually lifting the left and right handles upward in a forward position. Its simplicity of design invites regular usage as items can be loaded and unloaded with ease. Furthermore, its compact size and lightweight facilitates easy storage in confined spaces.

2. Description of Prior Art

Wheel barrows originally were designed to manually transport materials and items within a worksite. Subsequent designs included kits to convert wheel barrows to a cart to enable towing by garden tractors within the garden site. None have the capability to be towed at high speeds on public highways, public roads, nonpublic roads and off-road terrain.

Both Transporting methods limit distance and speed by which a conventional wheel barrow can haul materials and items. Prior art of converting a wheel barrow to cart does not facilitate transportation on public highways, public roads, nonpublic roads and off-road terrain at high speeds.

Cart conversions also become problematic as assembly to a wheel barrow is inconvenient, requires assembly time and conversions increase manufacturing and consumer costs. In addition, subsequent designs exhibiting two-front wheels are more difficult to manually steer and are less accurate when dumping material and items.

There have been no attempts to remedy this problem of transporting materials and items with a wheel barrow on public highways, public roads, nonpublic road and all off-road terrain surfaces at high speeds. U.S. Pat. No. 6,612,615 Dimand (September 2003), U.S. Pat. No. 6,390,496 Eicher (May 2002), U.S. Pat. No. 5,915,706 Mosley (June 1999), U.S. Pat. No. 5,509,681 Keller (April 1996), U.S. Pat. No. 5,236,111 Ferguson (August 1993), U.S. Pat. No. 5,087,061 Wallace (February 1992), U.S. Pat. No. 5,031,926 Wannamaker (July 1991), U.S. Pat. No. 4,789,171 Porter (December 1988), U.S. Pat. No. 4,740,008 Johnson (April 1988), U.S. Pat. No. 4,052,079 Lehman (October 1977).

(a) Each prior art does not address the opportunity to transport materials and items in a wheel barrow on public highways, public roads, nonpublic roads and all off-road terrain surfaces at high speeds. U.S. Pat. No. 6,612,615 Dimand (September 2003) is designated only to a cart system, which does not exhibit the ability to function as a wheel barrow.

(b) Each prior art requires conversion and additional assembly to an existing and/or conventional wheel barrow.

(c) Each prior art is not a self contained and/or all-in-one wheel barrow unit with the ability to be maneuvered manually and be towed by a motor vehicle for transport on public highways, public roads and other off-road terrain surfaces at high and low speeds.

(d) Each prior art is not designed and does not have the ability to be coupled or joined to any motor vehicle designed and classified for travel on public highways, public roads, nonpublic roads and all off-road terrain surfaces.

(e) Each prior art requires additional cost to the consumer to adapt a wheel barrow to a cart purpose.

(f) Each prior art requires assembly time, labor, and mechanical aptitude and skills by the consumer for conversion.

SUMMARY

In accordance with the present invention, a wheelbarrow trailer comprises an upper tub of various cubic-feet capacity. An upper tub is mounted to two parallel left and right structural rails which are fastened together triangularly by an end bracket. The opposite end of each rail functions as handles for steering and dumping the wheel barrow trailer. A front wheel and tire are both attached to both rails by means of an axle. In a preferred embodiment, attached to both rails and extending above and somewhat in front of the front wheel, is a coupler mounted on left and right coupler brackets. In a preferred embodiment one left high speed rated wheel, tire and axle, and one right high speed rated wheel, tire and axle. Both wheel assemblies are positioned behind the front wheel and in front of the handles on the left and right structural rails. The high speed rated wheels, tires, and axels enable the wheelbarrow trailer to travel at high or low speeds.

Objects and Advantages

Accordingly, besides the objects and advantages of the wheelbarrow trailer described in my invention, several objects and advantages of my wheelbarrow trailer are:

(a) to provide a wheelbarrow capable of functioning as a trailer for towing from one geographical location to another geographical location on public highways, public roads, nonpublic roads, and all off-road terrain surfaces at high and low speeds.

(b) to provide a wheelbarrow trailer that can be hitched and unhitched easily.

(c) to provide a wheelbarrow trailer that offers a gardener, homeowner and worker the ability to haul job materials directly to the job site without causing alterations to property, such as tire ruts in a lawn or disassembly of a fence for the access of a motor vehicle.

(d) my wheelbarrow trailer substitutes for a large trailer which requires more storage room and is awkward to maneuver either manually or by tow vehicle.

(e) my wheelbarrow trailer doesn't require backing up to the job site as it can be hitched and unhitched from motor vehicle at any location and taken to the garden or project site.

(f) my wheelbarrow trailer facilitates transportation of items and debris to and from any hard to access location.

(g) my wheelbarrow trailer saves labor and time as it facilitates one-time load and dump capabilities from pick up location to garden or project site.

(h) my wheelbarrow trailer requires no conversion as it is an all encompassing wheel barrow and trailer.

(i) my wheelbarrow trailer exhibits a front axle and one wheel for easy maneuvering on unpaved surfaces and/or all off-road terrain.

It is an object of my wheelbarrow trailer to provide an all encompassing hitch and go trailer capable of traveling at high and low speeds to enable the transport of materials and items from one geographical location to another geographical location at both high and low speeds on public highways, roads, nonpublic roads and all off-road terrain surfaces.

It is the further object of my wheelbarrow trailer to provide a trailer that can be stored in an upright position in a building structure to save space.

DRAWING FIGURES

Figure 2:
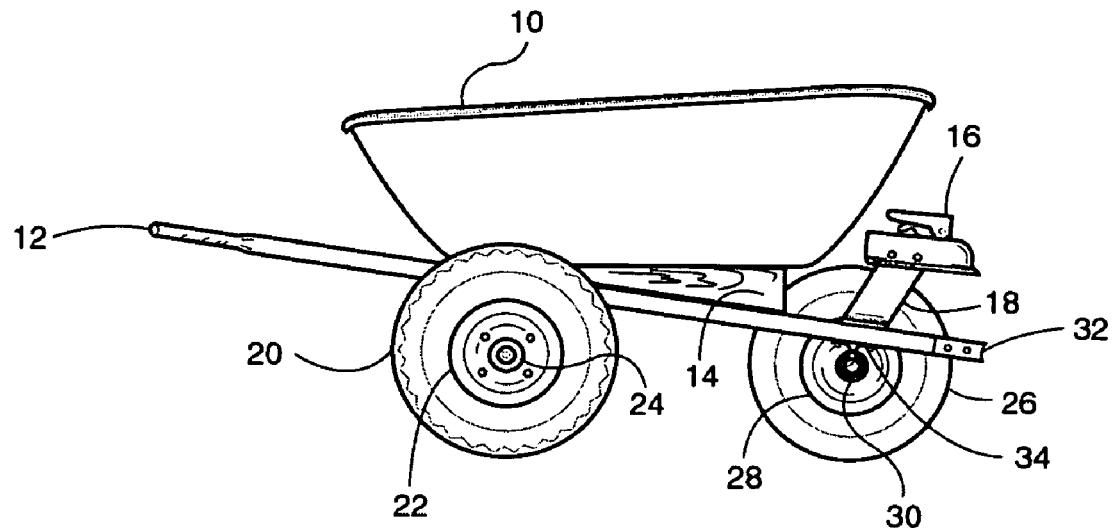
Figure 3:
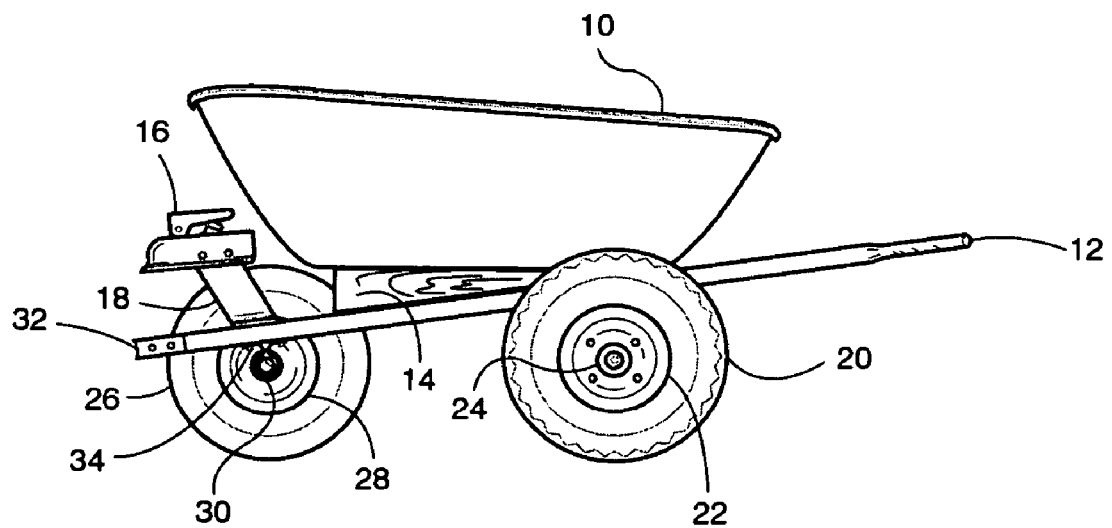
Figure 4:
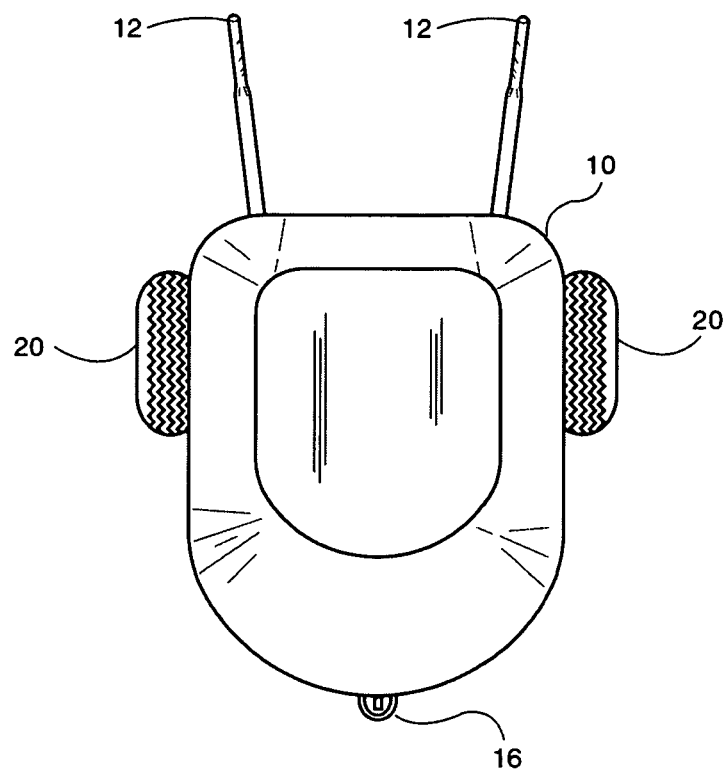
Figure 5:
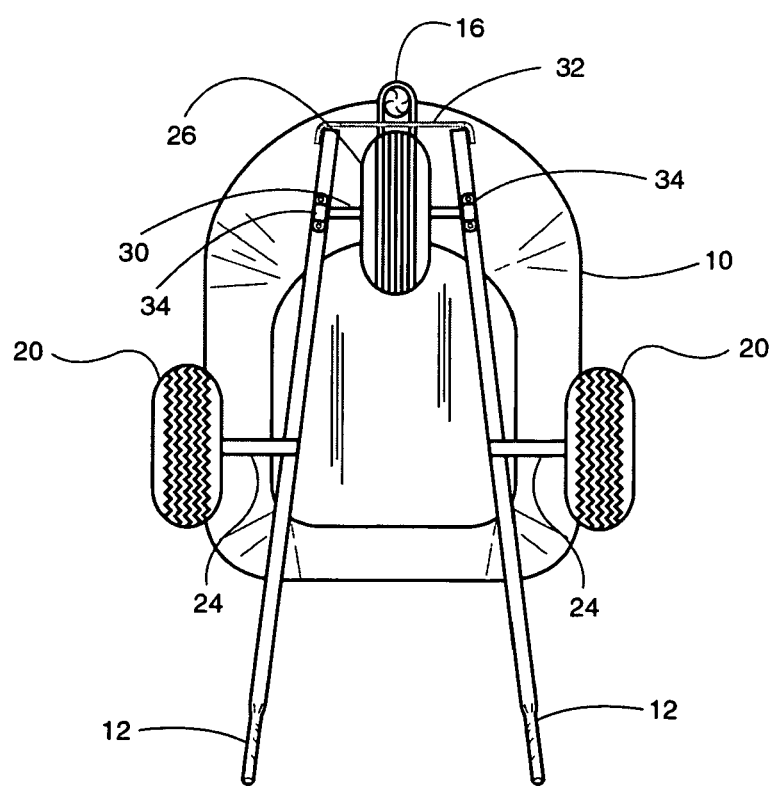
Figure 6:
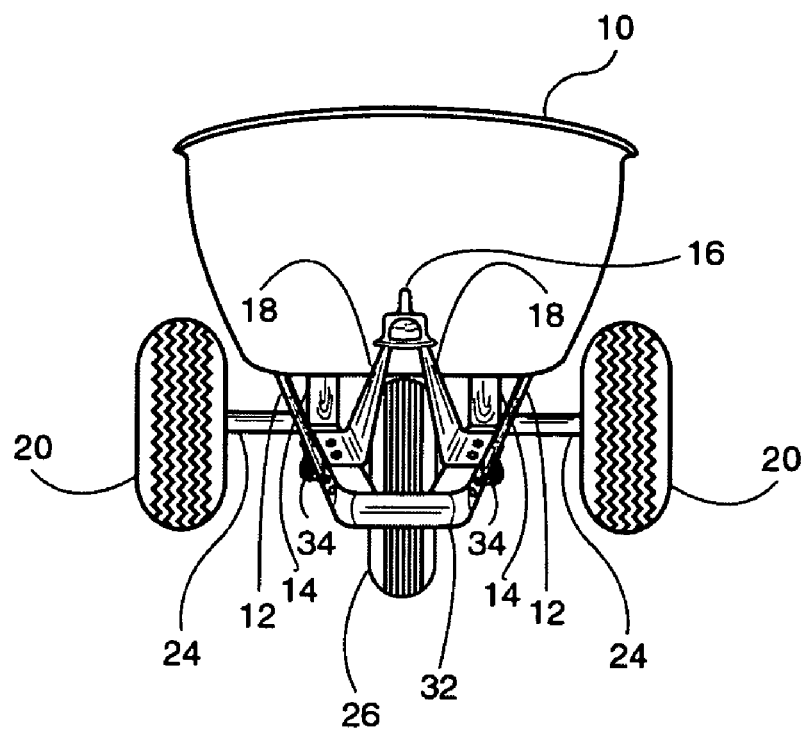
Figure 7:
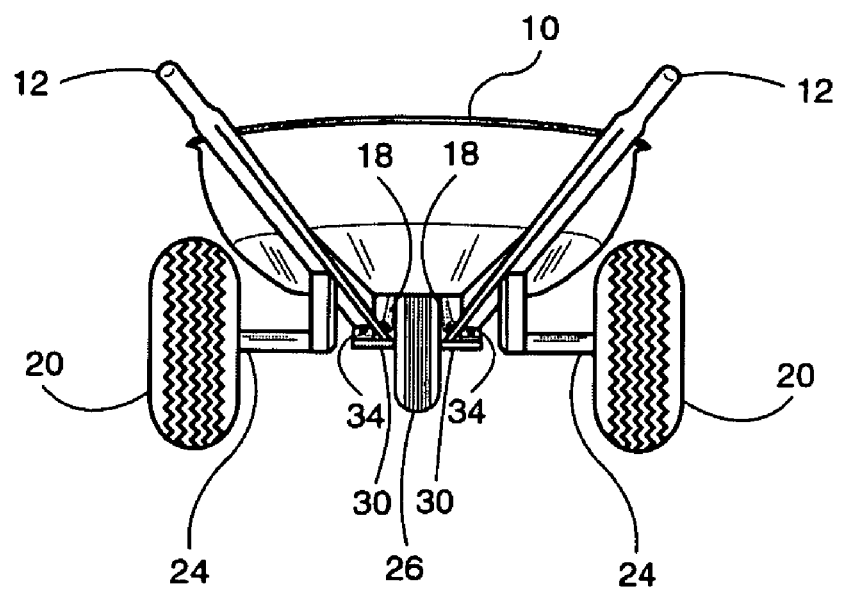

FIG. 1 is a side plan view of my wheelbarrow trailer, with a motor vehicle and hitch attachment shown in broken lines;
FIG. 2 is a left side elevation view thereof;
FIG. 3 is a right side elevation view thereof;
FIG. 4 is a top plan view thereof;
FIG. 5 is a bottom plan view thereof;
FIG. 6 is a front elevation view thereof;
FIG. 7 is a rear elevation view thereof;

REFERENCE NUMERALS IN DRAWINGS 10 steel tub
12 structural rail and/or handles
14 leveler
16 coupler
18 coupler bracket
20 rear tire
22 rear wheel
24 rear axle
26 front tire
28 front wheel
30 front axle
32 structural member bracket
34 axle bracket
36 hitch ball
38 receiver hitch

DESCRIPTION

FIGS. 1-7—Preferred Embodiment

The preferred embodiment of the wheelbarrow trailer is illustrated in FIGS. 1-7. It is comprised of a material holding steel tub (10) mounted to left and right structural rails and/or left and right handles (12) and through two levelers (14). The wheelbarrow trailer is attached to a motor vehicle by a coupler (16). The coupler (16) is attached to left and right coupler brackets (18). The left and right coupler brackets are attached to respective left and right structural rails (12). The ends of the structural rails act as handles for the wheelbarrow. The coupler (16) engages and locks on to a motor vehicle receiver hitch and ball as shown in FIG. 7.

The railer suspension consists of left and right rear tires (20) mounted to left and right wheels (22) which are assembled on left and right axles (24). A front tire (26) is mounted to a wheel (28) which is attached to the structural rails (12) via a front axle (30) and left and right axle brackets (34). A structural member bracket (32) is mounted to the left and right rails (12).

Operation

The manner of using my wheelbarrow trailer is unlike wheelbarrows in present use. Namely, one couples the wheelbarrow trailer to a motor vehicle receiver hitch for towing. See FIG. 1 where the trailer of the present invention is shown coupled to a motor vehicle designed for public highways, public roads, non-public roads, and off road terrain.

I position my wheelbarrow trailer directly behind a vehicle receiver hitch (38) and hitch ball (36). With both hands grasping left and right ends (i.e. handles) of the structural rails (12), apply body weight and at the same time, push down with both arms to lift front axle (30) and wheel (28) off ground to a height above receiver hitch (38) and hitch ball (36). With front wheel off the ground, push my wheelbarrow trailer forward and directly above hitch ball (36). Gradually release weight from left and right handles (12) until coupler (16) engages to motor vehicle receiver hitch ball, and lock coupler (16).

CONCLUSION, RAMIFICATIONS, AND SCOPE

Accordingly, the reader will see that the wheelbarrow trailer can be towed from one geographical location to another geographical location by a motor vehicle on public highways, public roads and nonpublic roads, and all off-road terrain surfaces at high and low speeds. Its unique design allows for an all-in-one wheelbarrow which can be loaded, hitched and unhitched with ease. Its compact size facilitates storage in a garage and small buildings. Furthermore, it saves labor and time as items and materials are handled only once from loading at one geographical location to transferring to another geographical location and at the same geographical location for unloading.

I claim:

1. A wheelbarrow for attachment to a motor vehicle with a hitch ball, the wheelbarrow comprising:
    a) a coupling device attached to left and right coupler brackets;
    b) said coupler brackets extending in an upward direction from respective left and right structural rails;
    c) said coupler brackets suspending said coupling device above a front wheel of said wheelbarrow;
    d) said coupling device being capable of locking engagement with the hitch ball; and
    e) said coupling device is suspended above said structural rails providing a sufficient space between said coupling device and said structural rails allowing said coupling device to be seated on the hitch ball.

2. The wheelbarrow of claim 1, including left and right rear axle members attached to respective said left and right structural rails, a left wheel assembly supported by said left axle, and a right wheel assembly supported by said right axle.

3. The wheelbarrow of claim 1, wherein said coupling device allows said wheelbarrow to be decoupled from the hitch ball.

4. The wheelbarrow of claim 1, wherein the wheelbarrow is capable of high and low speed travel on public roads.

* * * * *